United States Patent
Boucher et al.

[11] Patent Number: 5,889,532
[45] Date of Patent: Mar. 30, 1999

[54] CONTROL SOLUTIONS FOR THE RESOLUTION PLANE OF INVERSE KINEMATIC CHAINS

[75] Inventors: Yves Boucher, Terrebonne; Réjean Gagné, Montreal, both of Canada

[73] Assignee: Avid Technology, Inc., Tewksbury, Mass.

[21] Appl. No.: 691,340

[22] Filed: Aug. 2, 1996

[51] Int. Cl.$^6$ .................................................. G06T 15/70
[52] U.S. Cl. ............................................................ 345/473
[58] Field of Search ................................................ 345/473.5

[56] References Cited

U.S. PATENT DOCUMENTS

| | | | |
|---|---|---|---|
| 5,371,834 | 12/1994 | Tawel | 395/23 |
| 5,430,643 | 7/1995 | Seraji | 364/67.01 |
| 5,625,577 | 4/1997 | Kunii et al. | 364/578 |
| 5,692,117 | 11/1997 | Berend et al. | 345/113 |

OTHER PUBLICATIONS

Badler et al., "Articulated Figure Positioning by Multiple Constraints," IEEE Computer Graphics and Applications, vol. 7, No. 6, pp. 28–38, Jul. 1987.

Watt et al.:"Advanced Animation and Rendering Techniques—theory and Practice", ACM Press, New York, New York, 1992, Chapter 16, Animating Articulated Structures, pp. 369–384.

SOFTIMAGE|3D Animating—A Comprehensive User's Guide, Softimage Inc., Montreal, Canada, 1996, pp. 129–142, 1306–1311.

*Primary Examiner*—Rudolph J. Buchel, Jr.

[57] ABSTRACT

A method of and a system for controlling an inverse kinematics generated animation of an articulated chain is described. A resolution plane in a default orientation is computed by determining a root-effector vector extending from a root of an articulated chain to an end effector of the articulated chain and letting the resolution plane extend through the root-effector vector. A control icon representative of a position relative to the root is visually displayed. The resolution plane of an articulated chain is manipulated by manipulating the icon and re-determining the resolution plane using the root-effector vector and a root-control vector extending from the root to the icon. The animation of the articulated chain is constrained relative to the resolution plane and a solution of positions and orientations of all limbs of the articulated chain in achieving a goal is computed and displayed.

17 Claims, 6 Drawing Sheets

CONTROL SOLUTIONS FOR THE RESOLUTION PLANE OF INVERSE KINEMATIC CHAINS

FIELD OF THE INVENTION

The present invention relates to control solutions for manipulating a resolution plane of inverse kinematic chains. More specifically, the present invention relates to a system and method for controlling an inverse kinematics generated animation of an articulated chain.

BACKGROUND OF THE INVENTION

The human skeleton is made up of a torso, limbs, and articulation points, each of which can move independently of each other to some extent and also together. In animating a human skeleton, inverse kinematics, or sometimes referred to as "goal-directed motion", is one method of approaching animating articulated chains. Forward kinematics is the other method of animating articulated chains.

In forward kinematics, the skeleton is moved into position by specifying the angle of each joint and then keyframing these positions. Each movement is carefully planned to create the desired animation. Using forward kinematics, the orientation of each joint is precisely controlled allowing creation of many types of movements that may not be possible with inverse kinematics alone.

In inverse kinematics, the goal of an action is defined by positioning an end effector of an articulated chain. An inverse kinematics algorithm then calculates the position of the rest of the chain to reach the desired goal. For example, an animator may wish to animate a character reaching for a glass; the animator positions the wrist or end effector of an articulated chain representing the arm at a location in space where the glass is positioned. The inverse kinematics algorithm calculates the positions and orientations of the rest of the arm as it moves so that the final position has the wrist at the glass.

Inverse kinematics solves for the position and the orientation of all articulation points in the limb hierarchy that lead to the end effector.

$$\theta = f^{-1}(X)$$

where $\theta$ is a state vector and $X$ is a position and orientation in space of the end effector. The dimension of the state vector $\theta$ is equal to the degrees of freedom of the articulated chain.

The function $f(\ )$ is highly non-linear and rapidly becomes more complex as the number of limbs increase. In order to invert this function, the function is made linear by localizing about a current operating position and inverting the Jacobian to give:

$$d\theta = J^{-1}(dX)$$

where $J$ is a matrix of partial derivatives relating differential changes of $\theta$ to differential changes in $X$. The function is iterated towards the goal over a series of incremental steps.

Inverse kinematics theory is more fully described in *Advanced Animation and Rendering Techniques, Theory and Practice,* A. Watt and M. Watt, Addison-Wesley, 1992, New York, Chapter 16, Animated Articulated Structures, pp 369–384, the contents of which are hereby incorporated by reference.

Inverse kinematics is relatively more computationally expensive than forward kinematics. However in animating walking and arm movement, forward kinematics is counter-intuitive and tedious to do in practice. Inverse kinematics is thus preferred in many animation applications.

In computing a needed position and/or an orientation of each limb or link of an articulated chain so that the effector reaches the given goal, there can be computed a solution comprising a set of all positions and/or orientations of all limbs. In most cases, there exists many more than one solution for a given goal. For example, for an arm of a character to reach for a glass, the arm could either move across the chest or over the head. The inverse kinematics algorithm must then choose one of the possible solutions. Unfortunately, the chosen solution may not be the solution desired by the animator. Even worse, the inverse kinematics algorithm may choose a first solution for part of the animation and then "flip" to another solution for another part of the animation. The result is that the animated motion will be discontinuous, which is undesirable.

One method of addressing the discontinuity problem is to use a previous position or frame for calculating the next position of the articulated chain. The inverse kinematics algorithm is then limited in the number of possible solutions for the next position thereby avoiding discontinuities. The drawback of this approach is that animation is not fully reproducible. If any errors in the calculations had been made, such errors accumulate. The result becomes apparent when reciprocally extending an articulated chain; the articulated chain is unlikely to return to its original position.

SUMMARY OF THE INVENTION

The disadvantages of the prior art may be overcome by providing a novel control system and method for an animation system using inverse kinematics which obviates or mitigates at least one of the disadvantages of the prior art systems.

It is desirable to provide a novel control system and method for an animation system which can visually control the resolution plane of an articulated chain.

It is still further desirable to provide a novel control system which restricts an inverse kinematics algorithm to select only one solution of a set of all positions and/or orientations of all limbs and joints of an articulated chain.

According to a first aspect of the present invention, there is provided a method of allowing a user to modify, visually and interactively, a resolution plane of an articulated chain comprising the steps of:

defining a resolution plane of an articulated chain;

manipulating the resolution plane;

determining a solution of positions and orientations of all limbs of the articulated chain in achieving a goal, the solution being relative to the resolution plane.

According to another aspect of the present invention, there is provided a computer implemented control system for inverse kinematics animation, comprising:

means to manipulate a resolution plane of the articulated chain; and means to determine a solution of positions and orientations of the limbs in achieving a goal.

According to another aspect of the invention, there is provided a method of controlling an inverse kinematics generated animation of an articulated chain. The method comprises the steps of:

determining a resolution plane in a default orientation comprising the steps of determining a root-effector vector extending from a root of an articulated chain to an end effector of the articulated chain, and letting the resolution plane go through the root-effector vector, visually displaying an icon representative of a position relative to the root;

manipulating a resolution plane of an articulated chain by manipulating the icon and re-determining the resolution plane by determining a second vector extending from the root to the icon and combining the root-effector and second vectors;

determining a solution of positions and orientations of all limbs of the articulated chain in achieving a goal.

According to another aspect of the invention, there is provided a means for selecting a mode of manipulating the resolution plane. The modes include defining directly the resolution plane, defining an axis of rotation as perpendicular as possible to the resolution plane and defining a pre-determined amount of rotation relative to a last determined resolution plane.

According to yet another aspect of the present invention, there is provided an article of manufacture comprising:

a computer usable medium having computer readable program code means embodied therein for implementing an inverse kinematics algorithm for animating and controlling articulated chains, the computer readable program code means in the article of manufacture comprising:

computer readable program code means for causing the computer to accept input from a user representing selection of parameters for defining an articulated chain and of a goal for the articulated chain;

computer readable program code means for causing the computer to accept input from a user representing a selection of control of a resolution plane of the articulated chain;

computer readable program code means for causing the computer to accept input from a user representing a manipulation of the resolution plane;

computer readable program code means for causing the computer to calculate vectors defining the resolution plane;

computer readable program code means for causing the computer to compute a solution of positions and orientations of the articulated chain in achieving the goal; and computer readable program code means for causing the computer to display the solution.

According to yet another aspect of the invention, there is provided a graphical user interface for defining kinematic movement of an articulated chain. The interface has a display means for displaying an articulated chain and a resolution plane and a control icon for manipulating the resolution plane. The icon is responsive to user input.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
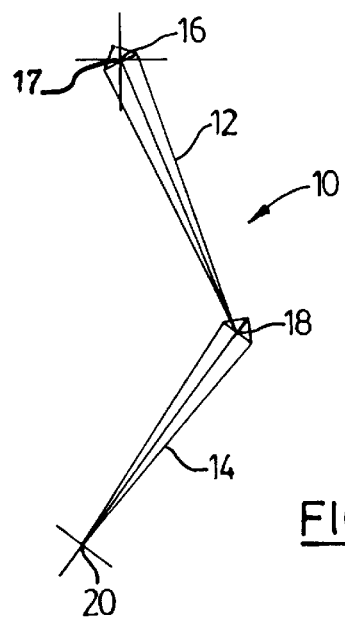
FIG. 1 is an illustration of a simple articulated chain.

Referring to FIG. 1, a simple articulated chain 10 is illustrated. Articulated chain has a first rigid limb 12 and a second rigid limb 14. Limb 12 has root 16 at one end. Root 16 is a first point of the chain 10 and partially determines the orientation of the chain. Limb 12 is joined to root 16 at articulation point 17. Limbs 12 and 14 are joined at articulation point 18. The remote end of limb 14 has end effector 20.

The limbs 12 and 14 of articulated chain 10 can have any desired length. The limbs cannot be separated from each other. In most cases, when the end effector 20 is moved in 2D or 3D space, some or all of the limbs must be moved in order for the limbs to stay together. The new desired position and/or orientation that the end effector 20 must reach is called a goal.

The articulation points 17 and 18 are modelled as ball joints that can be rotated about three axes and can move in any plane.

In FIG. 1, a simple two limbed articulated chain has been illustrated for simplicity purposes only. The present invention is not limited to a two limbed chain. It will be fully understood that the articulated chain may have any number of limbs or links. For example, a skeleton may be modelled as a plurality of multiple chains wherein a chain root of one articulated chain is a child of another chain or object.

Figure 2:
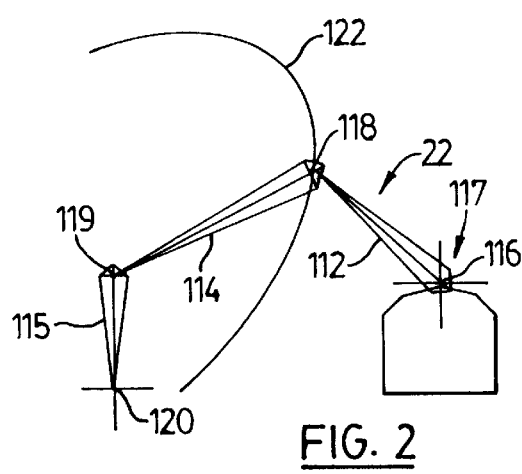
FIG. 2 is an illustration of an articulated chain.
Figure 3:
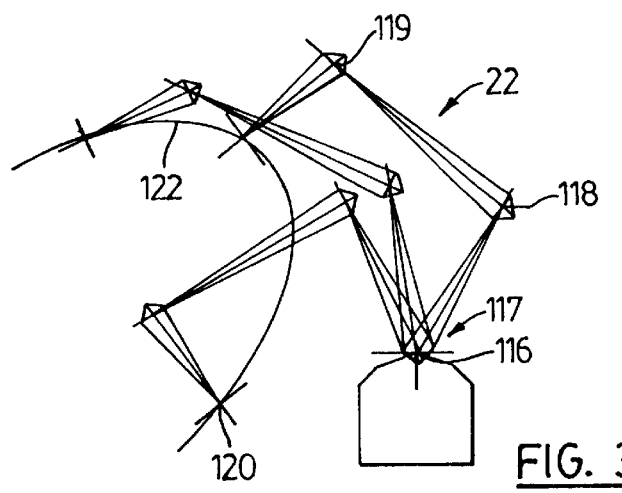
FIG. 3 is an illustration of an articulated chain of FIG. 2 showing the positions and/or orientations as calculated by an inverse kinematics algorithm.

Referring to FIGS. 2 and 3, a three limbed articulated chain 22 is illustrated. Chain 22 has limbs 112, 114 and 115 joined at articulation points 117, 118 and 119. Root 116 is one end of the chain 22 and an end effector 120 is the opposite end.

An animator may create an animation by defining a goal of an action by positioning the end effector 120 at a desired location or along a desired path or trajectory 122.

The inverse kinematics algorithm computes the new positions and/or orientations of all limbs of the articulated chain 22 to ensure that all limbs stay connected while moving the end effector 120 to the goal.

The set of all positions and/or orientations of all limbs computed by the inverse kinematics algorithm is known as a solution. However in most cases, there exist more than one solution for a given goal and the inverse kinematics algorithm must select one of the possible solutions. Once the positions and/or orientations for all limbs have been computed, the limbs of the articulated chain are moved into the new positions animating motion of the articulated arm.

FIG. 3 illustrates three solutions as calculated by the inverse kinematics algorithm in positioning the articulated chain 22 to reach three pre-selected goals.

Figure 4:
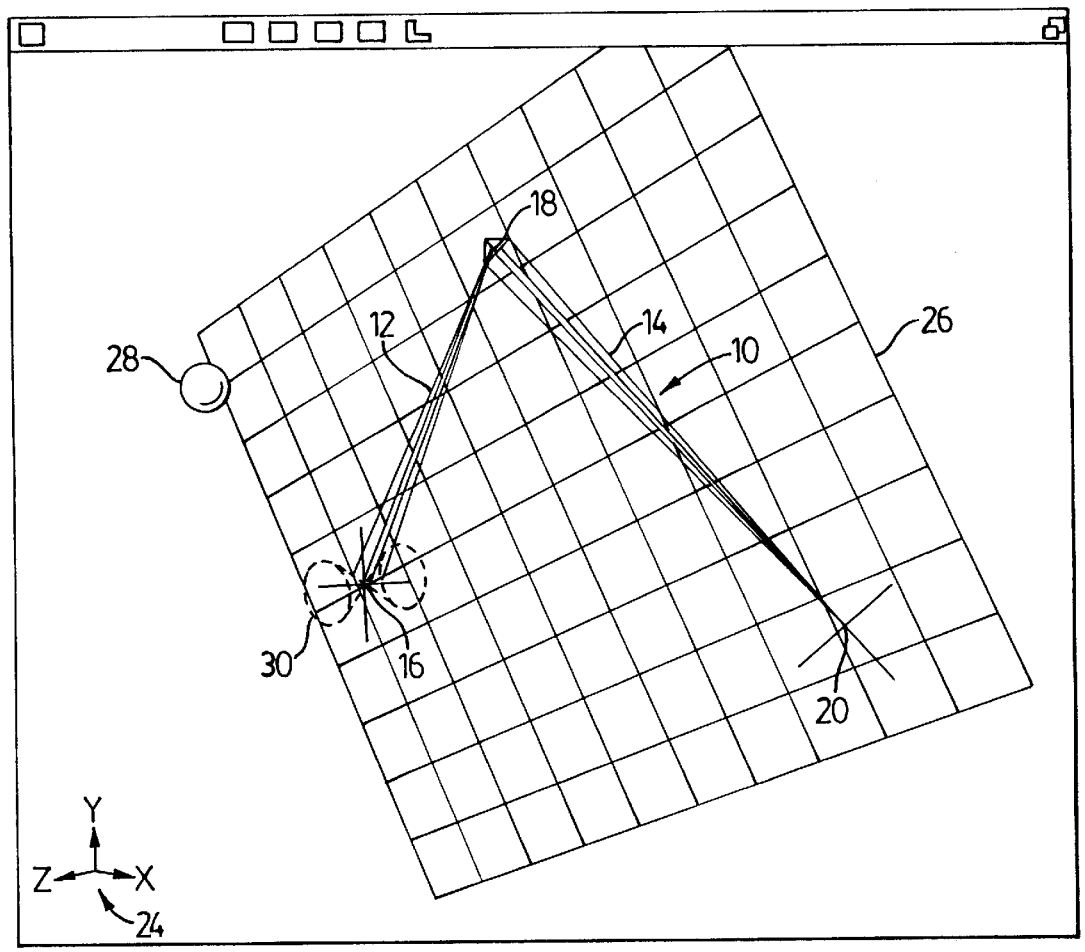
FIG. 4 is a computer screen projection of the articulated chain of FIG. 1.

Referring to FIG. 4, a computer screen projection is illustrated. Visually, the articulated chain 10 appears on the screen. An orthogonal symbol icon 24 is projected at one corner to give a perspective to the screen projection. Graphically projected is a plane image 26. A control icon 28 is manipulated about the screen projection via a mouse to control the position and/or orientation of the articulated chain as described below. In the preferred embodiment, control icon 28 is displayed as a sphere.

Plane image 26 is an imaginary plane which extends through the root 16 and the end effector 20. Plane image 26 represents the general orientation or resolution plane of the articulated chain 10. Plane image 26 is illustrated as an array of boxes which appear deformed due to the perspective display. The default of the plane image 26 and thus a default resolution plane also extends through the articulation point 18. The default preferred axis of rotation will extend in the z direction extending from the root 16.

The resolution plane of an articulated chain is defined as an imaginary plane which is attached in some way to the articulated chain. The resolution plane is oriented in 3D space and includes at least the root-effector vector. Since the resolution plane is attached to the articulated chain, whenever a rotation is applied to the resolution plane, the rotation is applied to the entire articulated chain. However, the resolution plane does not prevent the individual limbs from moving in space.

Figure 6:
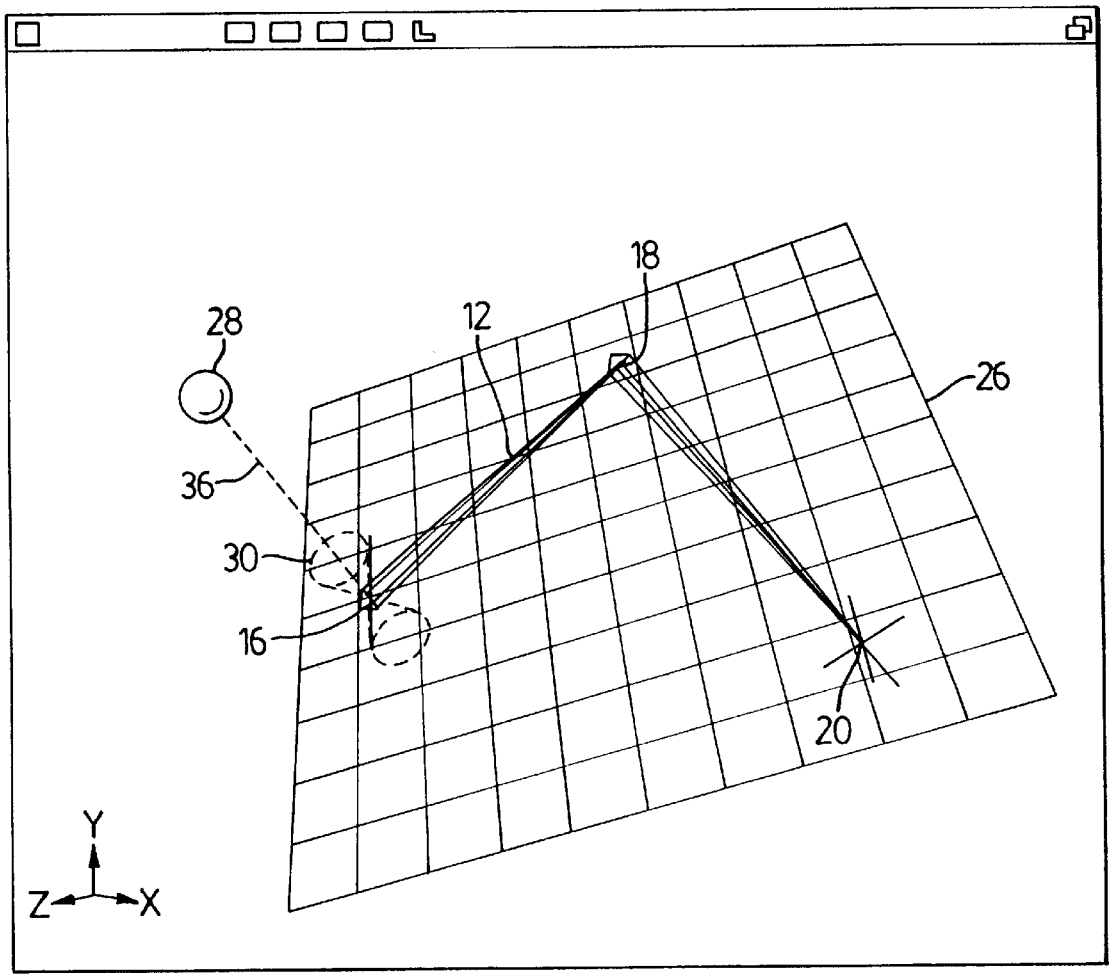
FIG. 6 is a computer screen projection of the articulated chain of FIG. 1 being manipulated using a Preferred Axis Control of the present invention.
Figure 8:
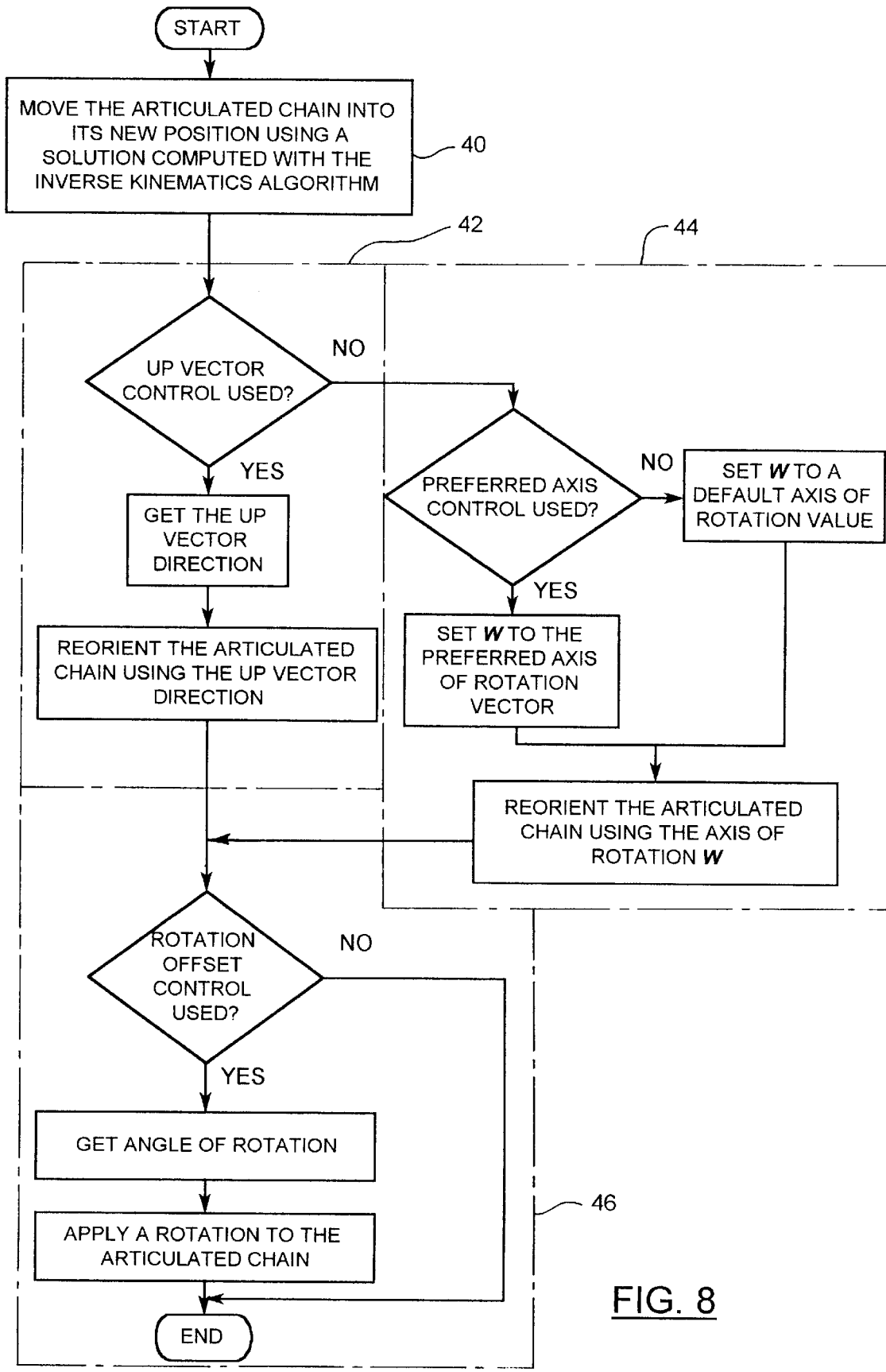
FIG. 8 is a flowchart of the implementation of the present invention into computer readable code.

Referring to FIG. 6, the articulated chain 10 could be controlled by a Preferred Axis Control module 44 (shown in FIG. 8). An icon or a drag list from a WINDOWS Toolbar can be provided to initiate the Preferred Axis Control module 44. Once initiated, the control icon 28 and root 16 will define a root-control vector which is displayed as axis 36 which defines the axis of rotation of articulated chain 10. The defined axis of rotation replaces the default axis of rotation, i.e., the z direction extending from the root 16.

The orientation of the articulated chain 10 is thus constrained by visually selecting the preferred axis of rotation which then defines the resolution plane to be as perpendicular thereto as possible.

Axis 36 defines a root-control vector w pointing from root 16 to control icon 28. Given the root-effector vector g, defined by the vector pointing from root 16 to effector 20 and where w≠g, the 3D vector u can be computed as u=w×g. The resolution plane can be easily determined since it contains both u and g. The solution computed by the inverse kinematics algorithm will then be applied to the chain in a way such that the resolution plane of the chain will respect this preferred axis constraint.

For example, to animate an arm of a character touching the character's opposite shoulder, the arm could either move across the chest wherein the axis of rotation is substantially vertical, i.e. in the y direction or move over the head wherein the axis of rotation is substantially horizontal i.e. in the z direction. The Preferred Axis Control module 44 provides control to select the axis of rotation which may also be animated over time.

Double-cone shaped icon 30 graphically represents a critical zone on the screen projection with the apices of the cones at root 16 and extending on an axis which extends through the root 16 and the control icon 28. The critical zone is a zone in which the general orientation of the chain 10 changes rapidly as a result of the constraints being applied. If the root-control vector and the root-effector vector come close to being in alignment with each other, the resolution plane will change rapidly, and at the limit, will "flip" from one orientation to another. The double-cone shaped icon 30 will indicate where this "flip" will occur in space. Graphically, the colour of the double-cone shaped icon 30 can change to represent different conditions. For instance, the double-cone shaped icon 30 can be blue if a default preferred axis of rotation is used. Further, if the control icon 28 moves into the critical zone, the double-cone shaped icon 30 can change color.

Figure 5:
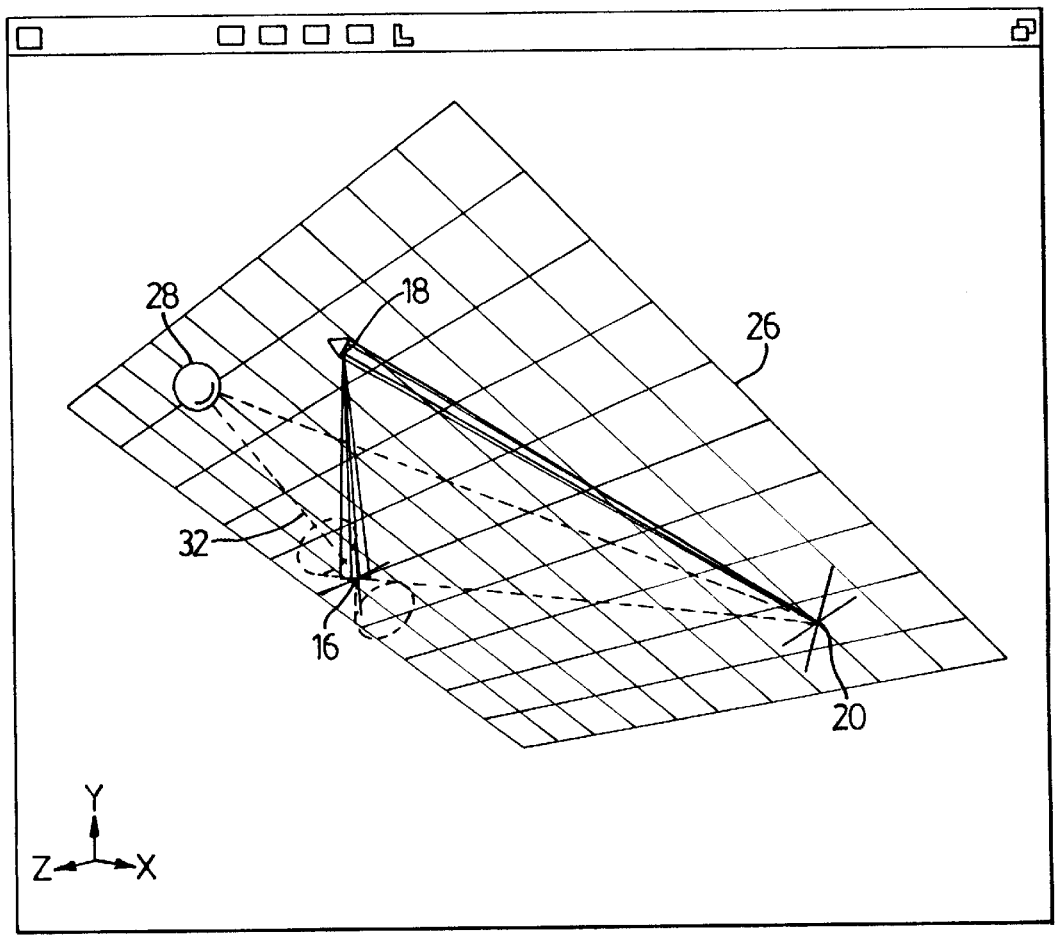
FIG. 5 is a computer screen projection of the articulated chain of FIG. 1 being manipulated using an Up Vector Control of the present invention.

Referring now to FIG. 5, the articulated chain 10 may be constrained using an Up Vector Control module 42 (shown in FIG. 8). An icon or a drag list from a WINDOWS Toolbar can be provided to initiate the Up Vector Control module 42. Once initiated, control icon 28, root 16 and end effector 20 will form a triangle 32 which defines the resolution plane of articulated chain 10 as represented by image plane 26. In other words, the orientation of the articulated chain 10 is constrained by visually defining the resolution plane. In the case of a 2D chain, where all limbs are constrained to stay on a plane, the articulation point 18 will be constrained to be on the resolution plane.

In the case of a 3D chain, only the root 16 and the effector 20 will be on the resolution plane, but rotation of the resolution plane will still cause rotation in the articulated chain 10 in a direct manner.

The Up Vector Control determines a root-control vector w which is the vector pointing from the root 16 of the articulated chain 10 towards the control icon 28. The root-control vector w is equal to the 3D vector u. Given the root-effector vector g, where u≠g, the resolution plane of the articulated chain 10 is rotated to contain both u and g. Since u and g are known, the resolution plane can easily be determined. The solution computed by the inverse kinematics algorithm will then be applied to the chain in a way that the resolution plane of the chain will respect the Up Vector Constraint.

For example, the arm motion of a breaststroke swimmer may be animated using an Up Vector Control module 42. Once initiated, the control icon 28 can be manipulated to position the articulation point 18 or elbow at the same height as the root 16 or shoulder. The end effector 20 can be moved in a circular pattern. The articulation point 18 or elbow will remain on the image plane 26.

The image plane 26 could also be moved over time to rotate the resolution plane. Rotation of the resolution plane by manipulating the control icon 28 will add a wing flapping motion to the articulated chain 10. To continue with the breaststroke example, when the hands are near the chest, the elbows must be lowered.

In the given example, a two limbed articulated chain is used. If a greater number of limbs are used, the Up Vector Control module 42 will rotate the resolution plane which will rotate all of the limbs between the root and the end effector. Further, the multi-limbed articulated chain could be modelled as a multiple of separate articulated chains. The Up Vector Control could be applied independently to each of the separate articulated chains.

Figure 7:
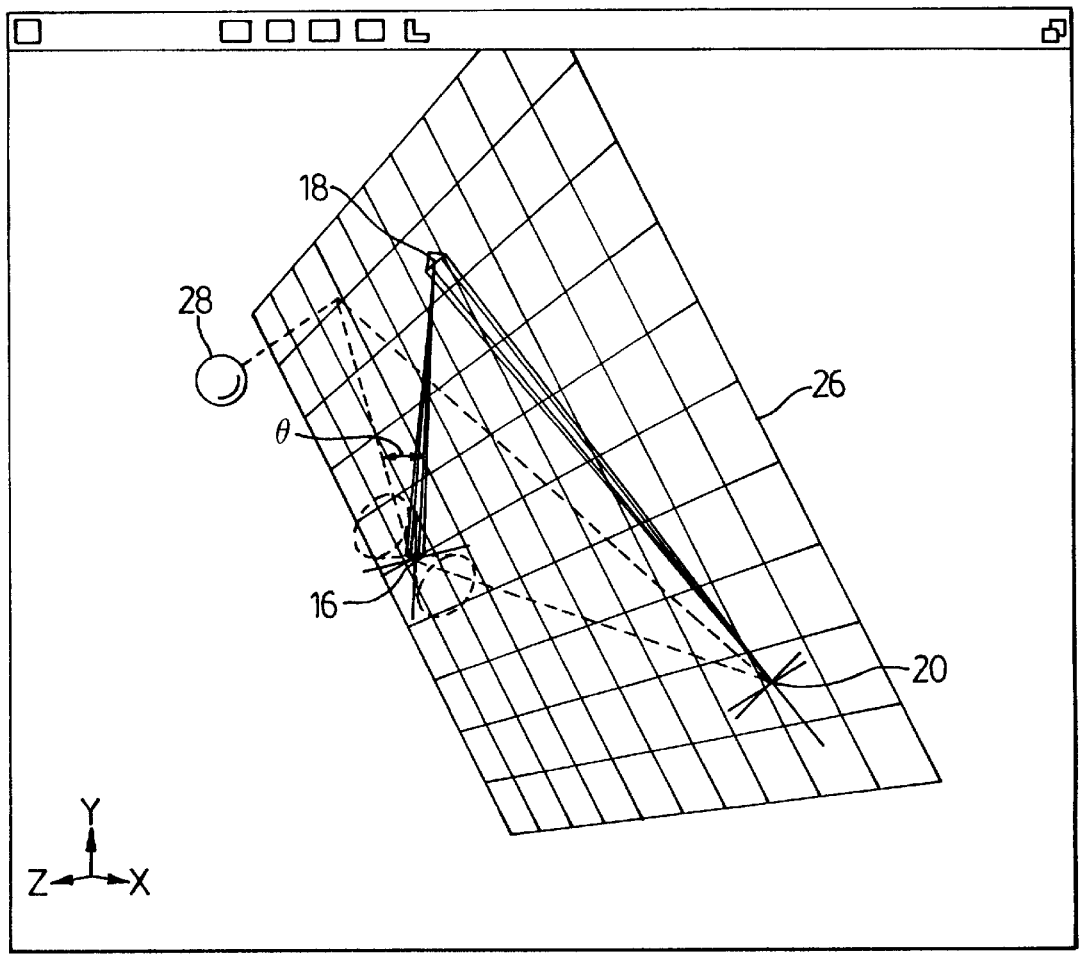
FIG. 7 is a computer screen projection of the articulated chain of FIG. 1 being manipulated using an Up Vector Control and a Rotation Offset Control of the present invention.

Referring to FIG. 7, the articulated chain 10 could be controlled by a Rotation Offset module 46 (shown in FIG. 8). An icon or a drag list from a WINDOWS Toolbar can be provided to initiate the Rotation Offset module 46. Once initiated, the angle of rotation to be applied to the resolution plane of the articulated chain 10 about the vector extending from root 16 to effector 20 can be controlled. The user inputs a desired amount of rotation in response to a graphical inquiry. The resolution plane of articulated chain 10 can be inclined by a selected angle θ from a last determined resolution plane, using an explicit Up Vector or Preferred Axis Control or a default resolution plane without affecting the positions of the root 16 and end effector 20. In FIG. 7, the Rotation Offset module 46 adds an offset to the orientation of resolution plane as determined by the Up Vector Control, that is, it inclines the plane θ degrees away from the orientation it would have had if only the Up Vector Control was used.

Referring to FIG. 8, an example flowchart for implementing the present invention in a computer readable code is illustrated.

Once the articulated chain 10 has been defined and the goal selected by the animator, the parameters thereof are provided to an Inverse Kinematics Algorithm module 40.

The Inverse Kinematics Algorithm module 40 has code embodying an inverse kinematics algorithm. The inverse kinematics algorithm calculates the positions and/or orientations of the articulated chain 10 in achieving the preselected goal.

The animator, using a mouse to drag and click a selected option from a WINDOWS Toolbar, first selects an Up Vector Control module 42. The animator then clicks and drags the control icon 28 to a desired position. The Up Vector Control module 42 calculates the 3D vector u and reorients the resolution plane and then reorients the articulated chain 10 relative to the resolution plane.

The animator may select a Preferred Axis Control module 44. If the Up Vector Control module 42 is not selected, then the Preferred Axis Control module 44 is automatically selected. In the preferred embodiment, an animator may only select one of either of the Up Vector Control module 42 or the Preferred Axis Control module 44 since both modules set the orientation of the resolution plane in an absolute manner, preventing simultaneous control. Further, in order to prevent conflicts, the Up Vector Control module 42 is arbitrarily given priority over the Preferred Axis Control module 44. It is understood that the selection of priority is arbitrary and therefore other combinations of priority could be selected or the different modules could be used separately.

If a preferred axis is not selected, the module 44 automatically sets the vector w to a default axis of rotation. The animator can select a preferred axis of rotation and the module will then compute the 3D root-control vector u.

The animator may then select Rotation Offset Control module 46. Once the angle of rotation θ has been selected, the rotation is applied to the resolution plane.

The Rotation Offset Control module 42 allows the animator to animate the resolution plane without affecting the position of the other control (Up Vector or Preferred Axis). For example, if an object A of a scene is used as an Up Vector Control, but this object has a given position that should not change relative to the articulated chain, resolution plane can still be rotated from 0 to 360 degrees around the root-effector vector g by animating the θ angle of this Rotation Offset Control, 0 degrees being the pure Up Vector Control as it is currently positioned.

The solution can then be displayed on a computer screen and stored on a suitable electronic storage medium.

The inverse kinematics algorithm is independent of the control of the resolution plane. The same solution computed by the inverse kinematics algorithm could be used and reoriented in space using a different resolution plane. Returning to the breaststroke swimmer example, for a given position of the hand, the position and/or orientation of the forearm and arm are computed by the inverse kinematics algorithm. The orientations are relative to the first limb, namely the arm. Using the same solution, the arm can be re-oriented by rotating it along the shoulder-wrist axis. This will not affect the angle between the arm and the forearm, and the wrist will still reach the goal. The orientation of the arm relative to the shoulder is the only thing changed using the present invention. The animator now has control of the inverse kinematics solution allowing the animator to orient the articulated chain in space in a desired fashion.

The above-described embodiments of the invention are intended to be examples of the present invention and alterations and modifications may be effected thereto, by those of skill in the art, without departing from the scope of the invention which is defined solely by the claims appended hereto.

We claim:

1. A method of controlling an inverse kinematics generated animation of an articulated chain including a chain root, an end effector and at least one fixed-length articulated member therebetween, comprising the steps of:

defining a resolution plane of an articulated chain, said resolution plane including at least a root-effector vector extending from said root to said end effector and wherein movement of said plane results in corresponding movement of each of said at least one fixed-length members; and manipulating said resolution plane with a graphical user interface to reorient said articulated chain; and determining an inverse kinematics solution to move said reoriented articulated chain to a desired goal.

2. A method as claimed in claim 1 wherein said step of manipulating includes rotating about said resolution plane a pre-selected amount.

3. A method as claimed in claim 1 wherein said step of manipulating includes visually displaying a control icon representative of a position relative to said root, said icon operably responsive to user input such that movement of said icon results in a corresponding movement of said resolution plane.

4. A method as claimed in claim 3 wherein said said resolution plane includes said root-effector vector and a root-control vector extending from said root to said control icon.

5. A method as claimed in claim 3 wherein said corresponding movement maintains a root-control vector extending from said root to said visual control co-planar with said resolution plane.

6. A method as claimed in claim 3 wherein said corresponding movement maintains a root-control vector extending from said root to said visual control generally perpendicular to said resolution plane.

7. A method as claimed in claim 3 wherein said method further comprises a step of visually displaying to said user a critical zone icon representing undesirable resolution plane positions.

8. A method as claimed in claim 7 wherein said critical zone icon is a double-cone shaped icon said cones arranged such that the apex of each cone is adjacent the apex of the other on an axis extending between said root and said control icon.

9. A method of controlling an inverse kinematics generated animation of an articulated chain including a chain root an end effector and at least one fixed-length member therebetween, comprising the steps of:

displaying in a graphical user interface a control icon representative of a position relative to said root;

determining a resolution plane in a default orientation by determining a root-effector vector extending from said root to said end effector and determining a root-control vector extending from said root to said control icon, and calculating said resolution plane to include said root-effector vector and said root-control vector:

displaying in said graphical user interface a representation of said plane to a user manipulating said resolution plane in response to user input to manipulate said icon and re-determining said resolution plane using said root-effector vector and said root-control vector extending from said root to said control icon, wherein movement of said plane results in corresponding movement of each of said at least one fixed-length members; and determining an inverse kinematics solution to move said articulated chain members to a desired goal.

10. The method as claimed in claim 9 wherein said method includes the step of selecting a mode of manipulating the resolution plane, wherein said modes include defining directly the resolution plane, defining an axis of rotation generally perpendicular to the resolution plane and defining a predetermined amount of rotation of said resolution plane relative to a last determined resolution plane.

11. A computer implemented control for an animation system of articulated chains comprising a chain root an end effector and at least one fixed-length member therebetween which uses an inverse kinematics algorithm, comprising:

means to define a resolution plane of an articulated chain;

means responsive to user input to manipulate the position and orientation of said resolution plane;

means to reorient said articulated chain to correspond to said position and orientation of said resolution plane; and means to employ inverse kinematics to animate said articulated chain within said resolution plane to achieve a goal.

12. A computer implemented control as claimed in claim 11 wherein said means to manipulate said resolution plane includes:

a moveable icon representative of an end point of a root-control vector originating from said root of said articulated chain.

13. A computer implemented control as claimed in claim 11 wherein said means to define said resolution plane includes means for selecting between an up vector control means, a preferred axis control means and/or a rotational offset control means; said up vector control means including means for displaying a triangle having corners comprising a control icon, said root and said end effector; said preferred axis control means having means for displaying a line between said control icon and said root and wherein said resolution plane is generally perpendicular to a root-control vector extending between said control icon and said root; and said rotational offset control means having means for displaying a triangle having corners comprising a point rotationally offset from said control icon, said root and said end effector.

14. An article of manufacture comprising:

a computer usable medium having computer readable program code means embodied therein for implementing an inverse kinematics algorithm for animating and controlling articulated chains including a chain root, and end effector and at least one fixed-length member therebetween, the computer readable program code means in said article of manufacture comprising:

computer readable program code means for causing the computer to accept input from a user representing selection of parameters for defining an articulated chain and of a goal for said articulated chain;

computer readable program code means for causing the computer to accept input from a user representing a selection of controls for a resolution plane of said articulated chain;

computer readable program code means for causing the computer to accept input from a user representing a manipulation of the position and orientation of said resolution plane; computer readable program code means for causing the computer to reorient and reposition said articulated chain in to correspond to said manipulated resolution plane:

computer readable program code means for causing the computer to compute a solution of positions and orientations of said articulated chain in achieving said goal; and computer readable program code means for causing the computer to display said solution.

15. An interactive method of controlling an inverse kinematics generated animation of an articulated chain including a chain root, an end effector and at least one fixed-length member therebetween, comprising the steps of:

displaying an articulated chain and a resolution plane image responsive to user input selecting parameters of a goal for said end effector of said articulated chain;

displaying a control icon for said user to manipulate the orientation and position of said resolution plane image;

responsive to user input, selecting a mode for determining said resolution plane, responsive to user input, manipulating said control icon and responsively determining said resolution plane;

determining an inverse kinematics solution of the position and orientation of each said at least one member of said articulated chain in achieving a goal; and displaying said solution.

16. The interactive method as claimed in claim 15 wherein said modes include defining directly the resolution plane, defining an axis of rotation generally perpendicular to the resolution plane and defining a pre-determined amount of rotation of the resolution plane relative to a last determined resolution plane.

17. A graphical user interface for defining inverse kinematics-based movement of an articulated chain, comprising:

display means for displaying an articulated chain and a resolution plane thereof, a control icon for manipulating the position and orientation of said resolution plane, said icon responsive to user input and means to determine and display on said display means a critical zone icon to identify to said user undesirable positions and orientation of said resolution plane.

* * * * *